Patented Oct. 11, 1949

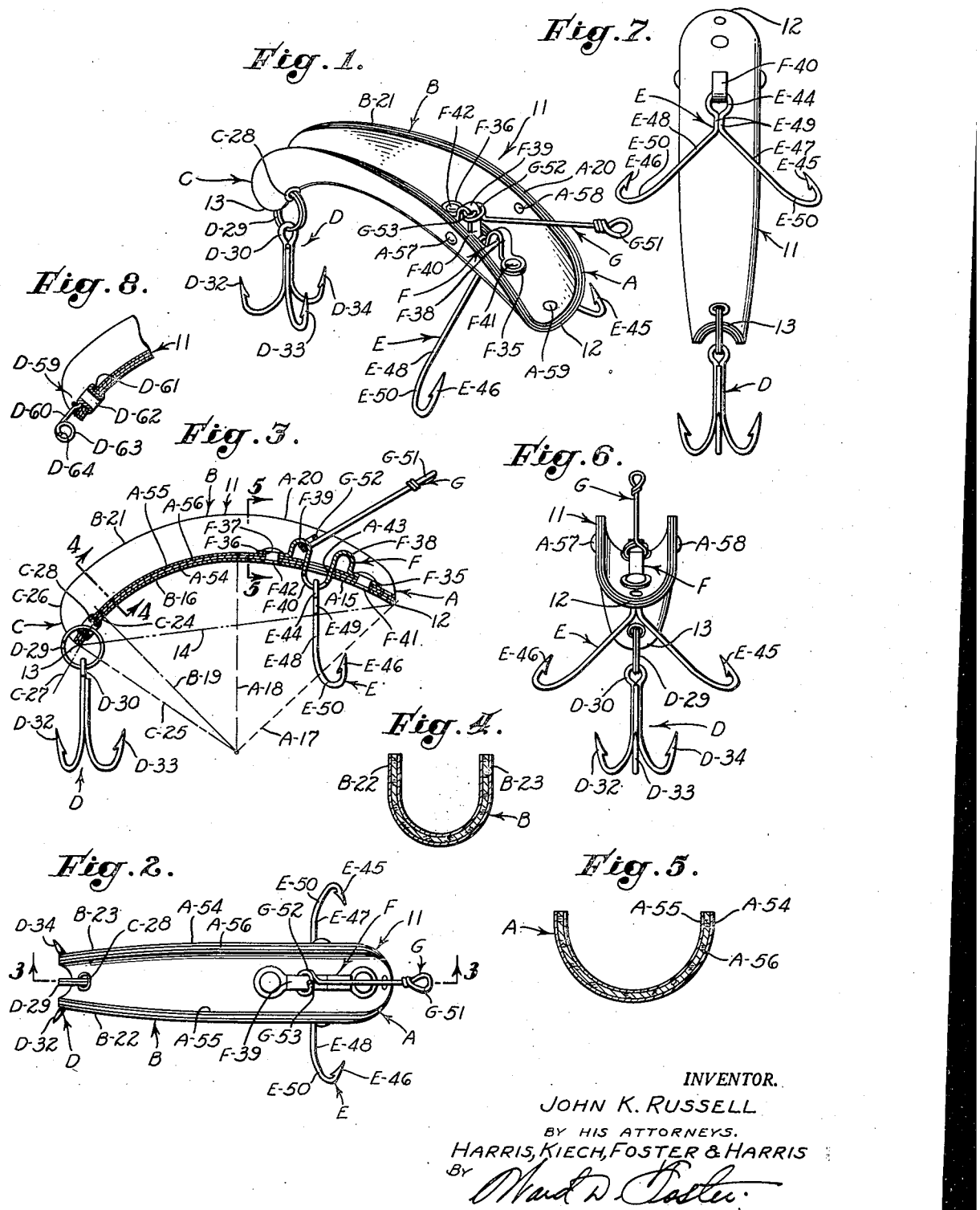

2,484,747

UNITED STATES PATENT OFFICE 2,484,747

FISH LURE

John K. Russell, North Hollywood, Calif.

Application May 23, 1947, Serial No. 749,919

8 Claims. (Cl. 43—42.5)

My invention relates to a fish lure to be used in casting or trolling.

One of the objects of the invention is to provide a fish lure so formed that its resistance to movement through the water causes it to pitch and yaw or wobble in simulation of the motion of a fish of commensurate size swimming at a comparable speed.

It is another object of my invention to provide a fish lure of the character described which is capable of pitching, yawing, and darting movements of a rapidity and extent which may be quickly and easily varied and controlled by the user. In accordance with the invention this may be accomplished by providing upon the lure a plurality of connecting means longitudinally spaced from each other for the attachment of a leader or line, whereby, when the lure is connected to the leader or line by one of such means, the lure will simulate the swimming motion of a fish of comparable size in slowly moving water where its rate and extent of pitching and yawing or wobbling are comparatively less and whereby, when the lure is connected to the leader or line by another of such connecting means, the lure will simulate the swimming motion of a fish of comparable size in fast moving water where its rate and extent of pitching and yawing or wobbling are comparatively greater.

This variation in the rapidity and extent of the motions of the lure may be accomplished also by varying the location of a sinker upon the line with respect to its attachment to the lure; thus, if the sinker is moved along the line close to the lure, the rapidity and extent of the darting movement of the lure are diminished, and, if the sinker is moved to a greater distance from the lure, the darting movement of the lure is increased in rapidity and extent.

My invention contemplates that the connecting means for the attachment of a leader or line may include two or more than two connecting members longitudinally spaced from each other, dependent upon the chord length of the lure and the degree of variations desired by the user in the extent and rapidity of movement of the lure.

Thus the lure subject of the invention is capable of use as a substitute for two or more lures, e. g., one adapted for simulating the swimming motion of a fish in slow water and one or more adapted for simulating the swimming motion of a fish in faster water.

It is another object of my invention to provide a lure of the class described which is extremely durable and resistant to deformation when struck by a fish.

Another object of my invention is the provision of a lure of the character described which can be easily formed from plastic or thin material such as steel, aluminum, brass, copper, or the like.

It is another object of my invention to provide a lure of this character which will float if desired, so that the possibility of its becoming entangled in rocks or vegetable growth in the bottom of the body of water is minimized. One of the methods of accomplishing the object last stated is to provide a lure which is formed of laminations of thin metal and a very light material, such as cork, so that the specific gravity of the entire lure, including the hooks and any metallic leader embodied, is less than 1.

Still another object of my invention is the provision of such a lure having means for quickly, easily, and securely connecting a leader or line to and disconnecting a leader or line from the lure to secure movements of the lure of any desired extent and rapidity.

For use in States that restrict the type or number of hooks which can be used on a single lure it is desirable that the lure be adapted for use with hooks of different types and numbers, while retaining the desired capacity for variation in extent and rapidity of its darting movement, and it is a corresponding object of my invention to provide such a lure. This object is accomplished in part by so relating the degree and extent of curvatures of the parts of the lure body to each other and so placing the point of attachment of the lure body to a line or leader that the lure has a darting action when drawn through the water with no hooks attached thereto. The weight of the hooks diminishes the extent and rapidity of the darting action of the lure, and this is compensated for by the provision of means for attaching a leader or line nearer to the front end of the lure and may also be compensated for by moving the sinker on the line to a greater distance from the lure. The object last stated is accomplished in part by providing means for the quick and easy attachment to and detachment from the lure of hooks of different sizes and types, such, for example, as single hooks, double hooks, or treble hooks, all hooks having more than one pointed end being referred to herein as multiple hooks.

The provision of means for the quick and easy attachment to and detachment from the lure of hooks is desirable also for the easy storage of the lure and hooks in the user's kit without the entangling of the hooks which usually results if the lure is stored with the hooks attached thereto.

It is desirable that lures of the character described be adapted for surfacing in a manner to provide different degrees of light-reflectivity and different colors in order that they will have the desired degree of visibility and attractiveness to fish under different visibility conditions in the water. The lure of my invention has this desirable attribute, for it can be provided with a surface of different degrees of light-reflectivity and color easily and inexpensively, as, for example, by polishing, plating, painting, or enamelling.

It is desirable that the lure be capable of moving with the desired characteristics, extent, and rapidity of movement with hooks of different sizes and weights. It is also desirable that the lure be capable of use with the desired movements with a single hook, a double hook, a treble hook, or any combination of these hooks at either or both the points of attachment of the hooks to the lure. It is an object of my invention to provide a lure with these desirable attributes.

An embodiment of the invention capable of accomplishing the foregoing objects and others is described in the following specification, which may be more readily understood by reference to the accompanying drawing.

In the drawing,

Fig. 1 is a perspective view of the lure of my invention;

Fig. 2 is a top plan view of the lure body;

Fig. 3 is a sectional view taken as indicated by the line 3—3 of Fig. 2;

Fig. 4 is a transverse sectional view taken as indicated by the line 4—4 of Fig. 3;

Fig. 5 is a transverse sectional view taken as indicated by the line 5—5 of Fig. 3;

Fig. 6 is a front end elevational view;

Fig. 7 is a bottom plan view; and

Fig. 8 is a fragmentary sectional view of an alternative embodiment of means for connecting the rear hook to the body of the lure.

Referring to the drawing, which is for illustrative purposes only, the numeral 11 indicates the body of the lure of my invention, which includes a front section A, a rear section B, and an end portion C. A rear hook is indicated by the letter D, a front hook by the letter E, a connecting member by the letter F, and a connecting link by the letter G.

As is illustrated in the drawing, the body 11 is both longitudinally and transversely curved, the upper surface of the body 11 being the concave surface. The degrees of curvature of the front section A and the rear section B are different, both longitudinally and transversely, and the relationship of these curvatures affects the relative extent and rapidity of the pitching and yawing or wobbling motion of the lure.

While it will be apparent that variations in the relative dimensions and degrees of curvature causing variations in the relative extent and rapidity of the different motions of the lure can be made while still providing a movement of the lure simulating the movement of a fish of comparable size, dimensions and degrees of curvature of a lure which I have found to be extremely desirable are hereinafter given by way of example only.

Some of the dimensions are given in terms of chord length of the lure, which is the distance between the forward lower extremity 12 and the lower rear extremity 13 of the lure and is represented by the broken line 14 of Fig. 3.

The lower surface of the forward section A, indicated by the numeral A-15, is curved about a radius substantially equal to the chord length 14. The lower surface of the rear section B, indicated by the numeral B-16, is curved about a radius which is approximately sixty per cent of the chord length 14. Thus, if the chord length 14 is approximately 3 inches, the radius of the surface A-15 will be approximately 3 inches, and the radius of the surface B-16 approximately 1¹³⁄₁₆ inches.

The portions A-15 and B-16 are curved over substantially equal angles, as indicated by the broken radial lines A-17, A-18, and B-19. I have found that angles of about 40° to 50° provide the desired movements for the lure.

The upper edges of the front and rear sections A and B, which are indicated by the numerals A-20 and B-21, are curved about the same center as the lower surface B-16 with a radius greater than the radius of the lower surface B-16 by from ten to twenty per cent of the chord length 14.

As is illustrated in Figs. 2, 4, 5, and 6, the degree of transverse curvature of the body 11 is least at the forward end of the front section A and increases progressively rearwardly in the front section A and throughout the rear section B, so that near the rearward end of the rear section B portions of the side walls, indicated by the numerals B-22 and B-23, are substantially parallel. The maximum width found desirable is one-third to one-fifth of the chord length. The width of the body 11 is substantially constant at the maximum value throughout the front section A and diminishes in the rear section B to about two-thirds the maximum width.

The lower surface of the end portion C, indicated by the numeral C-24, is curved about the same center as the lower surface B-16 with the same radius and, as illustrated by the broken radial lines B-19 and C-25, through about 8° to 15°. The upper edges of the rear portion C, indicated by the numeral C-26, are curved about a radius of about the maximum width of the lure and, as indicated by the radial lines B-19 and C-27, through about 90° to 120°.

Extending through the bottom of the end portion C adjacent its rearward end is an eyelet C-28, and a ring D-29 is passed around the wall of the end portion C between the end of such portion and the eyelet C-28. As illustrated in the drawing, the ring D-29 may be so formed as to have approximately two concentric adjacent turns between which the wall of the end portion C between its rearward terminus and the eyelet C-28 may be passed to install or remove the ring D-29.

Such a ring may be employed also to facilitate the installation thereon and the removal therefrom of an eye D-30 of the rear hook D which may be of any type. I prefer to use a multiple hook, e. g., a double or treble hook, with extra long shanks. The rear hook D is illustrated as a treble hook arranged so that in most positions of the hook relative to the body 11 at least two of the hook ends D-32, D-33, and D-34 are positioned beyond the side walls B-22 and B-23 of the rear section B and the edges C-26 of the end portion C. It will be apparent that freedom of movement of the rear hook D relative to the body 11 is permitted by virtue of the connection of the ring D-29 to the end portion C and the connection of the eye D-30 to the ring D-29.

The connecting member F is provided with two legs F-35 and F-36, each with an opening F-37 therein, a plurality of projecting loops or eyes, illustrated as two, F-38 and F-39, in the drawing, and a depending loop or eye F-40 between and connecting the upwardly projecting legs F-35 and F-36. The connecting member F is positioned upon the bottom of the upper surface of the forward section A and secured thereto by rivets F-41 and F-42 which extend through the openings F-37 and through the bottom of the front section A. The depending eye F-40 extends through an opening A-43 in the bottom of the front section A and extends beneath the lower surface A-15 of this section.

An eye E-44 of the front hook E is engaged with the eye F-40, so that the hook E is capable of limited rotational movement relative to the body 11. The front hook E may be of any type, but is preferably a double or treble hook, and is illustrated as a double hook with two hook ends E-45 and E-46. Shanks E-47 and E-48 of the hook E preferably have portions E-49 adjacent the eye F-40 which are parallel and in contact with each other and portions E-50 which diverge forwardly, so that the hook ends E-45 and E-46 are in front of the shank portions E-47 and E-48 when the hook E is freely suspended from the eye F-40 and the body 11 is stationary. If a hook is used which does not have separable shanks, it is connected to the eye F-40 by a ring similar to the ring D-29 previously described.

If the lure is used in water containing weeds or the like, the front hook E may be removed and installed in a reverse position, so that the hook ends E-45 and E-46 are trailing the shank portions E-47 and E-48 and a double hook with its hook ends trailing substituted for the treble rear hook D illustrated in the drawing.

The lengths of the hooks D and E are preferably so related to the distance between their connections to the body 11 that they cannot interengage.

The link G is provided at its forward end with an eye G-51 in which the fish line may be secured. At its other end the link G is formed with a plurality of, and preferably two, complete turns G-52 adjacent and preferably in contact with each other, a free end G-53 of the outermost turn being bent outwardly away from the adjacent turn. In this manner, even though the hands of the fisherman be extremely cold or wet, he can readily remove the link G from or assemble it upon one of the upwardly extending eyes F-38 or F-39 of the connecting member F.

The eyes F-38 and F-39 are spaced apart longitudinally of the body 11 to give the desired degree of variation in the action of the lure for different connections of the link G for the chord length of the lure. I have found that a distance of about ¼ to ½ inch apart is satisfactory with a chord length of about 3 inches. More than two eyes may be provided to permit variations of such action in smaller increments or greater total value.

I have found that the upwardly extending eyes F-38 and F-39 should be located so that the midpoint between them is about twenty to thirty per cent of the chord length rearwardly of the front edge of the front section A. Arithmetical calculations are based on the above tolerance for longitudinal spacing of the fish line connection points and also based on the hereinbefore stated tolerance of longitudinal spacing between a pair of such connecting points (up to ½ inch). These arithmetical calculations establish that the points of securement of a fish line should be spaced about 11⅔ per cent to 38⅓ per cent of the chord length of the continuous arc, rearwardly of the front edge of the lure. If the link G is connected to the forward eye F-38, these movements of the lure simulate those of a fish swimming in swift water and, if connected to the rearward upwardly projecting eye F-39, these movements simulate more deliberate travel with less rapid movements like those of a fish in slow water or the actions of a fish looking for feed, injured or crippled or getting ready to rest.

If the greatest height of the side walls is of the order of forty to sixty per cent of the greatest depth of the body 11, a very desirable type of action is secured. If the radii defining the curvature of the bottom surface of the sections A, B, and C and the upper edges as viewed in side elevation (see Fig. 3) of the sections A and B are reduced, the action, and particularly the pitching movement, of the lure is increased. If the width of the body 11 is increased, the action is made slower, and a greater tolerance in the location of the upwardly projecting eyes F-38 and F-39 results.

I have found that, if the body 11 is formed of two thin sheets of metal A-54 and A-55 with a layer of very light material A-56, such as cork or balsa wood, therebetween, the specific gravity of the entire lure is made less than 1, so that it floats in water and does not sink to the bottom where it might become enmeshed in vegetable growth or snagged among rocks. More than two sheets of metal and more than one sheet of cork or the like may be employed without departing from my invention. The sheets or laminations may be secured together in any suitable manner, as by cementing or by riveting. In the drawings I have illustrated the laminations as secured together by rivets A-57 and A-58 simulating in location the eyes of a fish, a rivet A-59, and the eyelet C-28. The rivets A-57 and A-58 may be coated with a luminous material to further simulate the eyes of a fish.

In the alternative embodiment of the rear hook connecting means illustrated in Fig. 8 the numeral D-59 indicates a connector for a shank D-60, the forward end of which is formed into an eye D-61 which is secured to the upper surface of the end portion C adjacent its rearward end by an eyelet D-62. At its rearward end the shank D-60 is provided with a plurality of, and preferably with two, complete turns D-63 adjacent, and preferably in contact with, each other, a free end D-64 of the outermost turn being bent outwardly away from the adjacent turn. The turns D-63 are adjacent the rearward end of the end portion C and spaced therefrom a sufficient distance to permit the eye of a hook to be passed between the adjacent turns D-63 to connect the hook to the body B, the turns D-63 being in a vertical plane to facilitate the swinging movement of the hook.

From the foregoing it will be apparent that I have related the chord length of the body, the radii of curvature of the bottom surface of the body, the radii of curvature of the upper edges of the body, the degrees of transverse curvature of the body, the width and depth of the body, and the point of attachment of the body to the connecting member in a manner to provide pitching and yawing or wobbling movements of the lure of an extent and rapidity simulating such movements of a fish of comparable size.

While that embodiment of my invention hereinbefore illustrated and described is fully capable of performing the objects primarily stated, various modifications of such embodiment likewise capable of performing these objects will readily occur to those skilled in the art, and my invention is to be understood therefore as not limited to the specific embodiment hereinbefore illustrated and described but as including all modifications thereof coming within the scope of the claims which follow.

I claim as my invention:

1. In a fish lure, a body portion being continuously curved throughout its entire length and being curved transversely throughout its entire length to form side walls and a bottom throughout its entire length, said side walls and bottom providing a trough, said side walls being spaced increasingly closer to one another toward the rear of said body than at the front thereof.

2. In a fish lure, a body portion being curved in a continuous arc throughout its entire length and being curved transversely throughout its entire length to form side walls and a bottom throughout its entire length, said side walls and bottom providing a trough, said side walls having curves of decreasing radii from front to rear of said body portion.

3. In a fish lure, a body curved longitudinally in a continuous arc and being curved transversely to form side walls and a bottom, the side walls and bottom providing a trough on the upper surface of said body and the front and rear portions of the said continuous arc of the body pointing downwardly, the transverse curvature of said body being of decreasing radii from front to rear of said body.

4. In a fish lure, a body portion being continuously curved throughout its entire length and being curved transversely to form side walls and a bottom, said side walls and bottom providing a trough on the upper surface of said body portion, said side walls being spaced increasingly closer to one another toward the rear of said body portion throughout the entire length of said side walls.

5. In a fish lure, a body portion curved longitudinally in a continuous arc and curved transversely to form side walls and a bottom, the said walls and bottom providing a trough on the upper surface of said body portion and the front and rear portions of said continuous arc of the body pointing downwardly, said side walls being spaced increasingly closer to one another toward the rear of said body portion providing an increasingly narrow trough from front to rear of said body portion and securing means for a fishing line on said body portion having reversed curves, one of which is below the trough and the remainder of the curves being above the trough, the forward portion of the securing means being attached at the forward end of the trough.

6. In a fish lure, a body portion curved longitudinally in a continuous arc and curved transversely to form side walls and a bottom, the side walls and bottom providing a trough on the upper surface of said body portion throughout the entire length of said body portion, and the front and rear portions of said continuous arc of the body pointing downwardly, securing means for a fish line provided with points of securement to the line, the points of securement of the line to the securing means being located in an arc spaced vertically from the bottom of the lure and the midpoint between the points of securement being about 20% to 30% of the over-all chord length along said continuous arc rearwardly of the front edge of the lure.

7. In a fish lure, a body portion curved longitudinally in a continuous arc and curved transversely to form side walls and a bottom, the side walls and bottom providing a trough on the upper surface of said body portion throughout the entire length of said body portion, and the front and rear portions of said continuous arc of the body pointing downwardly, securing means for a fish line having a point of attachment to said line, the point of securement of the line to the securing means being spaced vertically from the bottom of the lure and spaced about $11\frac{2}{3}\%$ to $38\frac{1}{3}\%$ of the overall chord length of said continuous arc along said arc rearwardly of the front edge of the lure.

8. In a fish lure, a body portion curved longitudinally in a continuous arc and curved transversely to form side walls and a bottom, the side walls and bottom providing a trough on the upper surface of said body portion throughout the entire length of said body portion, and the front and rear portions of said continuous arc of the body pointing downwardly, securing means for a fish line having a point of attachment to said line, the point of securement of the line to the securing means being spaced vertically from the bottom of the trough within the forward end thereof, and spaced not less than $11\frac{2}{3}\%$ of the overall chord length of said continuous arc along said arc rearwardly of the front edge of the lure.

JOHN K. RUSSELL.

REFERENCES CITED

The following references are of record in the file of this patent:

UNITED STATES PATENTS

| Number | Name | Date |
|---|---|---|
| 578,762 | McMahon | Mar. 16, 1897 |
| 1,370,696 | Lindquist | Mar. 8, 1921 |
| 1,532,534 | Hewitt | Apr. 7, 1925 |
| 1,609,562 | Lonsdale et al. | Dec. 7, 1926 |
| 1,615,801 | Elmendorf | Jan. 25, 1927 |
| 1,687,478 | Marcus | Oct. 9, 1928 |
| 1,897,109 | Bobo | Feb. 14, 1933 |
| 1,967,692 | Walker | July 24, 1934 |
| 2,056,506 | Dopp | Oct. 6, 1936 |
| 2,088,775 | Davenport | Aug. 3, 1937 |
| 2,101,491 | Chilcott | Dec. 7, 1937 |
| 2,149,464 | Potts | Mar. 7, 1939 |
| 2,213,701 | Haselwood | Sept. 3, 1940 |
| 2,311,985 | Heddon | Feb. 23, 1943 |
| 2,334,613 | Dunkelberger et al. | Nov. 16, 1943 |